United States Patent
Gubbi Lakshminarasimha et al.

(10) Patent No.: US 11,790,518 B2
(45) Date of Patent: Oct. 17, 2023

(54) IDENTIFICATION OF DEFECT TYPES IN LIQUID PIPELINES FOR CLASSIFICATION AND COMPUTING SEVERITY THEREOF

(71) Applicant: Tata Consultancy Services Limited, Mumbai (IN)

(72) Inventors: Jayavardhana Rama Gubbi Lakshminarasimha, Bangalore (IN); Mahesh Rangarajan, Bangalore (IN); Rishin Raj, Bangalore (IN); Vishnu Hariharan Anand, Bangalore (IN); Vishal Bajpai, Bangalore (IN); Vishwa Chethan Dandenahalli Venkatappa, Bangalore (IN); Pradeep Kumar Mishra, Bangalore (IN); Gourav Singh Jat, Bangalore (IN); Meghala Mani, Bangalore (IN); Gangadhar Shankarappa, Bangalore (IN); Dinesh Sasidharan Nair, Bangalore (IN); Shashank Lipate, Bangalore (IN); Vineet Lall, Bangalore (IN); Kavita Sara Mathew, Bangalore (IN); Karthik Seemakurthy, Bangalore (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 258 days.

(21) Appl. No.: 17/357,210

(22) Filed: Jun. 24, 2021

(65) Prior Publication Data
US 2022/0036541 A1    Feb. 3, 2022

(30) Foreign Application Priority Data
Jul. 29, 2020    (IN) .............................. 202021032479

(51) Int. Cl.
*G06T 7/00*    (2017.01)
*G06T 7/11*    (2017.01)
(Continued)

(52) U.S. Cl.
CPC ....... *G06T 7/0006* (2013.01); *G01N 21/8851* (2013.01); *G06T 5/007* (2013.01);
(Continued)

(58) Field of Classification Search
None
See application file for complete search history.

(56) References Cited

U.S. PATENT DOCUMENTS 10,072,800 B1 * 9/2018 Logan ........................ E03F 7/00
2015/0029498 A1 * 1/2015 Guan .................... G06T 7/0006
356/237.1

(Continued)

FOREIGN PATENT DOCUMENTS

CN    104568983 B    3/2017
CN    110599459 A    12/2019

OTHER PUBLICATIONS

Senthilkumar "Review on Haze removal Techniques", Computer Intervention and Diagnostics in Clinical and Medical Images, pp. 113-123, Jan. 2019 (Year: 2019).*

(Continued)

*Primary Examiner* — Randolph I Chu
(74) *Attorney, Agent, or Firm* — Finnegan, Henderson, Farabow, Garrett & Dunner, LLP

(57) ABSTRACT

Current inspection processes employed for pipeline networks data acquisition aided with manually locating and recording defects/observations, thus leading labor intensive, prone to error and a time-consuming task thereby resulting in process inefficiencies. Embodiments of the present disclosure provide systems and methods for that leverage (Continued)

artificial intelligence/machine learning models and image processing techniques to automate log and data processing, reports and insights generation thereby reduce dependency on manual analysis, improve annual productivity of survey meterage and bring in process and cost efficiencies into overall asset health management for utilities, thereby enhancing accuracy in defect identification, analysis, classification thereof.

20 Claims, 12 Drawing Sheets

(51) Int. Cl.
  G06V 10/44    (2022.01)
  G01N 21/88    (2006.01)
  G06T 5/00    (2006.01)
  G06T 7/136    (2017.01)
  G06T 7/168    (2017.01)
  G06V 10/25    (2022.01)
  G06T 5/20    (2006.01)

(52) U.S. Cl.
  CPC .................. *G06T 5/20* (2013.01); *G06T 7/11* (2017.01); *G06T 7/136* (2017.01); *G06T 7/168* (2017.01); *G06V 10/25* (2022.01); *G06V 10/443* (2022.01); *G01N 2021/8877* (2013.01); *G01N 2021/8893* (2013.01); *G06T 2207/10016* (2013.01)

(56) References Cited

U.S. PATENT DOCUMENTS

| | | | | |
|---|---|---|---|---|
| 2015/0244946 A1* | 8/2015 | Agaian | ............ | H04N 5/33 |
| | | | | 348/164 |
| 2017/0323163 A1 | 11/2017 | Leung | | |
| 2019/0139215 A1* | 5/2019 | Starr | ............ | G06F 18/2148 |
| 2019/0339210 A1* | 11/2019 | Stewart | ............ | G01M 3/007 |
| 2023/0101112 A1* | 3/2023 | Aguilar | ............ | G06T 7/70 |
| | | | | 382/156 |

OTHER PUBLICATIONS

Piciarelli et al. "A Vision-Based System for Internal Pipeline Inspection", IEEE Transactions on Industrial Informatics, vol. 15, No. 6, pp. 3289-3299, Jun. 2019 (Year: 2019).*

Roh et al. "Differential-Drive In-Pipe Robot for Moving Inside Urban Gas Pipelines", IEEE Transactions on Robotics, vol. 21, No. 1, Feb. 2005 (Year: 2005).*

Moradi et al. "Review on Computer Aided Sewer Pipeline Defect Detection and Condition Assessment", Infrastructures 2019, Published: Mar. 1, 2019 (Year: 2019).*

Duran et al. "Pipe Inspection Using a Laser-Based Transducer and Automated Analysis Techniques", IEEE/ASME Transactions on Mechatronics, vol. 8, No. 3, Sep. 2003 (Year: 2003).*

Li et al. Research on Feature Points Extraction and Matching Technology of Pipe-wall Images, International Conference on Intelligent Control and Information Processing Aug. 13-15, 2010 (Year: 2010).*

Chaki et al. An Intelligent Fuzzy Multifactor Based Decision Support System for Crack Detection of Underground Sewer Pipelines, 2010 10th International Conference on Intelligent Systems Design and Applications (pp. 1471-1475) (Year: 2010).*

Hengmeechai, "Automated Analysis of Sewer Inspection Closed Circuit Television Videos Using Image Processing Techniques," University of Regina, Thesis, (2013).

Yu et al., "Dark Pixel Detection: A Novel Single Image Dehaze Approach," (2011).

* cited by examiner

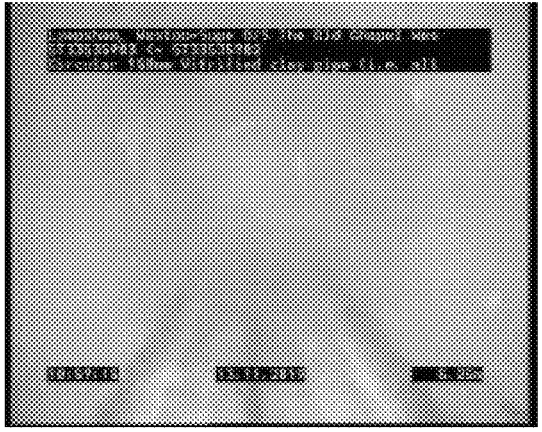 
FIG. 7A  FIG. 7B
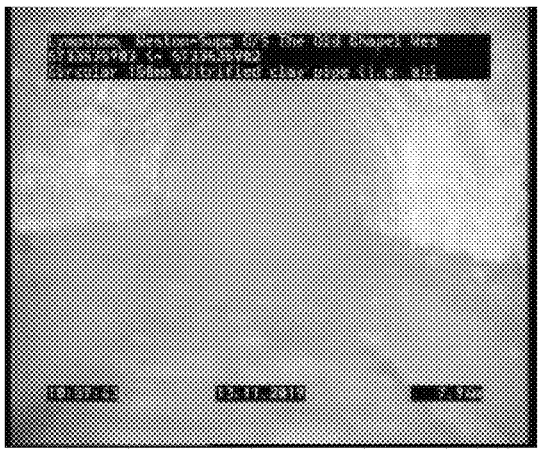 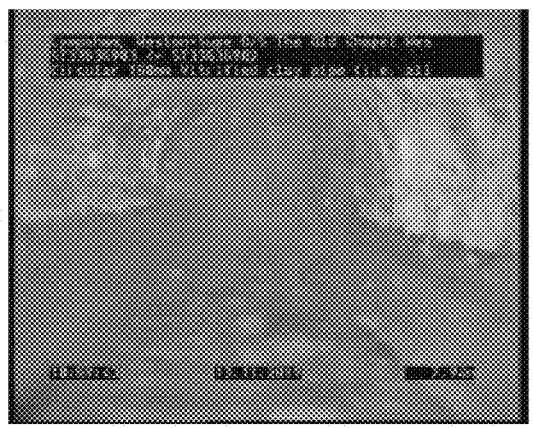
FIG. 7C  FIG. 7D

IDENTIFICATION OF DEFECT TYPES IN LIQUID PIPELINES FOR CLASSIFICATION AND COMPUTING SEVERITY THEREOF

PRIORITY CLAIM

This U.S. patent application claims priority under 35 U.S.C. § 119 to: India Application No. 202021032479, filed in India on Jul. 29, 2020. The entire contents of the aforementioned application are incorporated herein by reference.

TECHNICAL FIELD

The disclosure herein generally relates to pipeline inspection for defects identification, and, more particularly, to identification of defect types in liquid pipelines for classification and computing severity thereof.

BACKGROUND

Current inspection processes employed for pipeline networks such as fluid pipelines (e.g., crude oil pipelines) or liquid pipelines (e.g., sewer pipelines at water utilities, oil, natural gas and the like) involve surveying pipelines using a tele-operated remotely controlled robot vehicle by hosting camera and systems for data acquisition aided with manually locating and recording the defects and observations by trained service personnel watching the live footage.

Given the wide variety of objects, defects and observations involved for identification (e.g., approximately 85+ distinct classes), this manual activity is very labor intensive, prone to error and a time-consuming task limiting the overall coverage of the asset network in an year while entailing exorbitant costs, excessive human fatigue, poor productivity, processing and reporting delays and associated process inefficiencies—all arising due to intense and repetitive manual work at large scale. Additionally, collateral issues like road closure to traffic during the survey duration, poor turnaround time for reporting and insights generation and limited availability of qualified staff add to the execution challenges.

SUMMARY

Embodiments of the present disclosure present technological improvements as solutions to one or more of the above-mentioned technical problems recognized by the inventors in conventional systems. For example, in one aspect, there is provided a processor implemented method for identification of defect types in liquid pipelines for classification and computing severity thereof. The method comprises: receiving, via one or more hardware processors, an input data comprising at least one of a video data, and one or more images from an image capture device, wherein the input data is specific to a liquid pipeline; extracting, via the one or more hardware processors, one or more optimum frames from the input data specific to the liquid pipeline; dehazing the one or more extracted optimum frames to obtain one or more dehazed images; identifying from the one or more dehazed images one or more identified liquid banks and generating one or more contours based on the one or more identified liquid banks; detecting a change in a liquid level from the one or more generated contours; estimating a pose of the image capturing device based on (i) an angle of intersection, (ii) a segment intersection and (iii) a generated circle obtained from the one or more generated contours; identifying a first set of objects in the liquid pipeline using the estimated pose; identifying one or more defects in the liquid pipeline based on the first set of identified objects; and classifying the one or more defects into one or more categories.

In an embodiment, the step of detecting a change in a liquid level from the one or more generated contours comprises: fitting two or more lines in each of the one or more generated contours; determining one or more intersection points of the two or more lines; calculating an angle of intersection and generating a circle with radius R using the one or more intersection points of the two or more lines; calculating a segment intersection using the angle of intersection and the generated circle; and detecting the change in the liquid level based on the segment intersection.

In an embodiment, the one or more defects comprise at least one of (a) one or more fractures, (b) one or more breaks, (c) one or more cracks.

In an embodiment, the one or more defects are identified as at least one of (a) one or more fractures, (b) one or more breaks, (c) one or more cracks based on a defect ratio area.

In an embodiment, the one or more defects are identified using a semantic segmentation technique.

In an embodiment, the method further comprises computing a severity of the one or more identified defects based on a location associated therewith.

In an embodiment, the first set of objects are at least one of a structural object type and a functional object type.

In an embodiment, one or more defects identified around a wall of the liquid pipeline are classified as one of (i) a longitudinal defect type or (ii) a circumferential defect type.

In an embodiment, one or more defects identified around one or more junctions of the liquid pipeline are classified as one or more junction types.

In an embodiment, the one or more defects identified around the one or more junctions of the liquid pipeline are based on a change in structural position of the one or more junctions.

In an embodiment, the method further comprises: detecting, using a classification model, a second set of objects that are different from the first set of objects; pre-processing the second set of objects to obtain a set of pre-processed objects; applying a set of domain-based rules on the pre-processed objects to obtain at least a subset of the set of pre-processed objects; and classifying the subset of the set of pre-processed objects.

In an embodiment, one or more joints are identified in the liquid pipeline based on the extracted one or more optimal frames using a set of filters by: segmenting wall of the liquid pipeline into one or more regions using a semantic segmentation technique to obtain a plurality of regions of interest; applying a first pre-processing filter on the plurality of regions of interest to obtain a plurality of pre-processed regions of interest; applying, (i) a second pre-processing filter and (ii) a thresholding technique on the plurality of pre-processed regions of interest to obtain at least a subset of regions of interests; and applying a transformation technique on the subset of regions of interests to identify the one or more joints.

In another aspect, there is provided a system for identification of defect types in liquid pipelines for classification and computing severity thereof. The system comprises: a memory storing instructions; one or more communication interfaces; and one or more hardware processors coupled to the memory via the one or more communication interfaces, wherein the one or more hardware processors are configured by the instructions to: receive an input data comprising at least one of a video data, and one or more images from an image capture device, wherein the input data is specific to a liquid pipeline; extract one or more optimum frames from the input data specific to the liquid pipeline; dehaze the one or more extracted optimum frames to obtain one or more dehazed images; identify from the one or more dehazed images one or more identified liquid banks and generate one or more contours based on the one or more identified liquid banks; detect a change in a liquid level from the one or more generated contours; estimate a pose of the image capturing device based on (i) an angle of intersection, (ii) a segment intersection and (iii) a generated circle obtained from the one or more generated contours; identify a first set of objects in the liquid pipeline using the estimated pose; identify one or more defects in the liquid pipeline based on the first set of identified objects; and classify the one or more defects into one or more categories.

In an embodiment, the change in the liquid level from the one or more generated contours is detected by: fitting two or more lines in each of the one or more generated contours; determining one or more intersection points of the two or more lines; calculating an angle of intersection and generating a circle with radius R using the one or more intersection points of the two or more lines; calculating a segment intersection using the angle of intersection and the generated circle; and detecting the change in the liquid level based on the segment intersection.

In an embodiment, the one or more defects comprise at least one of (a) one or more fractures, (b) one or more breaks, (c) one or more cracks.

In an embodiment, the one or more defects are identified as at least one of (a) one or more fractures, (b) one or more breaks, (c) one or more cracks based on a defect ratio area.

In an embodiment, the one or more defects are identified using a semantic segmentation technique.

In an embodiment, the one or more hardware processors are further configured by the instructions to compute a severity of the one or more identified defects based on a location associated therewith.

In an embodiment, the first set of objects are at least one of a structural object type and a functional object type.

In an embodiment, one or more defects identified around a wall of the liquid pipeline are classified as one of (i) a longitudinal defect type or (ii) a circumferential defect type.

In an embodiment, one or more defects identified around one or more junctions of the liquid pipeline are classified as one or more junction types.

In an embodiment, the one or more defects identified around the one or more junctions of the liquid pipeline are based on a change in structural position of the one or more junctions.

In an embodiment, the one or more hardware processors are further configured by the instructions to: detect, using a classification model, a second set of objects that are different from the first set of objects; pre-process the second set of objects to obtain a set of pre-processed objects; apply a set of domain-based rules on the pre-processed objects to obtain at least a subset of the set of pre-processed objects; and classify the subset of the set of pre-processed objects.

In an embodiment, one or more joints are identified in the liquid pipeline based on the extracted one or more optimal frames using a set of filters by: segmenting wall of the liquid pipeline into one or more regions using a semantic segmentation technique to obtain a plurality of regions of interest; applying a first pre-processing filter on the plurality of regions of interest to obtain a plurality of pre-processed regions of interest; applying, (i) a second pre-processing filter and (ii) a thresholding technique on the plurality of pre-processed regions of interest to obtain at least a subset of regions of interests; and applying a transformation technique on the subset of regions of interests to identify the one or more joints.

In yet another aspect, there is provided a computer program product comprising a non-transitory computer readable medium having a computer readable program embodied therein, wherein the computer readable program, when executed on a computing device causes the computing device to: receive an input data comprising at least one of a video data, and one or more images from an image capture device, wherein the input data is specific to a liquid pipeline; extract one or more optimum frames from the input data specific to the liquid pipeline; dehaze the one or more extracted optimum frames to obtain one or more dehazed images; identify from the one or more dehazed images one or more identified liquid banks and generate one or more contours based on the one or more identified liquid banks; detect a change in a liquid level from the one or more generated contours; estimate a pose of the image capturing device based on (i) an angle of intersection, (ii) a segment intersection and (iii) a generated circle obtained from the one or more generated contours; identify a first set of objects in the liquid pipeline using the estimated pose; identify one or more defects in the liquid pipeline based on the first set of identified objects; and classify the one or more defects into one or more categories.

In an embodiment, the change in the liquid level from the one or more generated contours is detecting by: fitting two or more lines in each of the one or more generated contours; determining one or more intersection points of the two or more lines; calculating an angle of intersection and generating a circle with radius R using the one or more intersection points of the two or more lines; calculating a segment intersection using the angle of intersection and the generated circle; and detecting the change in the liquid level based on the segment intersection.

In an embodiment, the one or more defects comprise at least one of (a) one or more fractures, (b) one or more breaks, (c) one or more cracks.

In an embodiment, the one or more defects are identified as at least one of (a) one or more fractures, (b) one or more breaks, (c) one or more cracks based on a defect ratio area.

In an embodiment, the one or more defects are identified using a semantic segmentation technique.

In an embodiment, the computer readable program, when executed on the computing device further causes the computing device to compute a severity of the one or more identified defects based on a location associated therewith.

In an embodiment, the first set of objects are at least one of a structural object type and a functional object type.

In an embodiment, one or more defects identified around a wall of the liquid pipeline are classified as one of (i) a longitudinal defect type or (ii) a circumferential defect type.

In an embodiment, one or more defects identified around one or more junctions of the liquid pipeline are classified as one or more junction types.

In an embodiment, the one or more defects identified around the one or more junctions of the liquid pipeline are based on a change in structural position of the one or more junctions.

In an embodiment, the computer readable program, when executed on the computing device further causes the computing device to: detect, using a classification model, a second set of objects that are different from the first set of objects; pre-process the second set of objects to obtain a set of pre-processed objects; apply a set of domain-based rules on the pre-processed objects to obtain at least a subset of the set of pre-processed objects; and classify the subset of the set of pre-processed objects.

In an embodiment, one or more joints are identified in the liquid pipeline based on the extracted one or more optimal frames using a set of filters by: segmenting wall of the liquid pipeline into one or more regions using a semantic segmentation to obtain a plurality of regions of interest; applying a first pre-processing filter on the plurality of regions of interest to obtain a plurality of pre-processed regions of interest; applying, (i) a second pre-processing filter and a thresholding technique on the plurality of pre-processed regions of interest to obtain at least a subset of regions of interests; and applying a transformation technique on the subset of regions of interests to identify the one or more joints.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 7A through 7D depict one or more dehazed images outputted by the system of FIG. 1, in accordance with an embodiment of the present disclosure.

DETAILED DESCRIPTION

Figure 1:
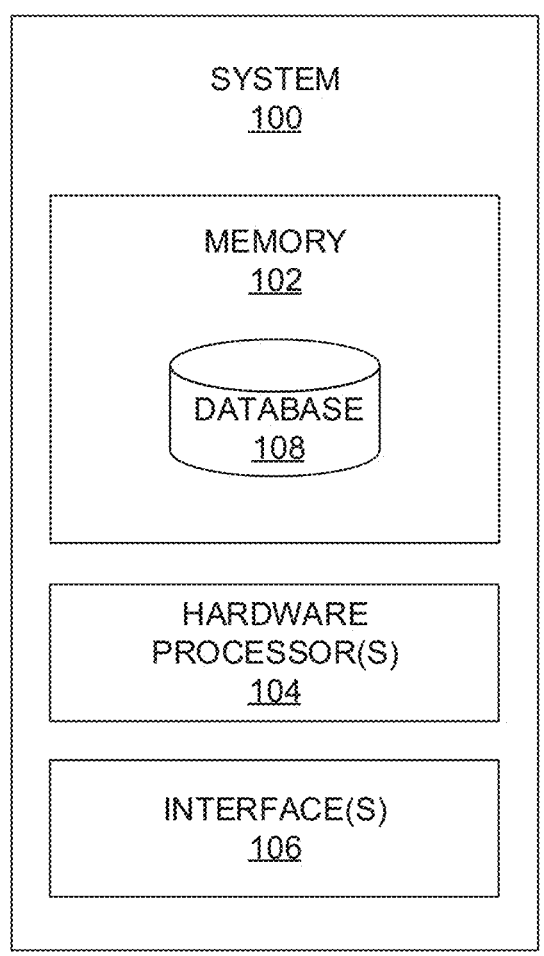
FIG. 1 depicts a system for identifying defect types in liquid pipelines for classification and computing severity thereof, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

As mentioned above, conventionally, processes employed for pipeline networks have a tele-operated remotely controlled robot vehicle to acquire data while rest of the downstream process is heavily reliant on specialized operations domain workforce personnel to manually identify, record and share the observations. This leads to poor response times to actively survey and maintain the overall infrastructure through the year. The current approaches to automate anomaly detection in sewers thus far have relied on either black box modelling techniques or image quality enhancement methods to classify defects. While this can have limited success under certain operating conditions or for certain defect classes, the varieties and eccentricities of defects encountered in a highly noisy environment (85+ distinct classes with one utility in one geography alone) calls for a multi-pronged classification approach.

Additionally, anomalies detection in a pipeline is often dependent on usage of expensive equipment like flow/pressure monitoring sensor systems that demand considerable maintenance effort and costs whereas for others like cracks, it is limited in both variety and extent. Limitations of current technology in identifying the categorization of the nature of defects (structural/functional) and the severity and granularity of defects often prompt transmission and distribution authorities of pipeline mains and services such as utilities divisions/departments/sectors to fall back on aggregate condition assessment method(s) leading to sub-optimal maintenance efforts on the field.

To address the above unsolved technical problems, embodiments of the present disclosure provide systems and methods that leverage artificial intelligence/machine learning models and image processing techniques to automate log and data processing, reports and insights generation thereby reduce dependency on manual analysis, improve annual productivity of survey meterage and bring in process and cost efficiencies into overall asset health management for Utilities, thereby enhancing satisfaction and improving market position.

Referring now to the drawings, and more particularly to FIGS. 1 through 12D, where similar reference characters denote corresponding features consistently throughout the figures, there are shown preferred embodiments and these embodiments are described in the context of the following exemplary system and/or method.

FIG. 1 depicts a system 100 for identifying defect types in liquid pipelines for classification and computing severity thereof, in accordance with an embodiment of the present disclosure. The system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., mobile communication device such as smart phones, tablet/tablet computer), workstations, mainframe computers, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises images (e.g., low quality images, and the like), video data corresponding to a liquid pipeline (e.g., sewer pipeline, oil, natural gas pipeline, and the like) or a fluid pipeline (e.g., crude oil pipeline) wherein the images and/or the video data is being captured from one or more image capturing devices (e.g., camera and the like). The database 108 further comprises (i) one or more optimum frames (or one or more best frames) extracted from the input data, (ii) dehazed image(s), (iii) information on identified liquid banks (e.g., identified water banks), generated contours, change in liquid level detected (e.g., change in water level detected in sewer pipeline, water pipeline), and the like, (iv) pose estimated for the image capturing device based (a) an angle of intersection, (b) a segment intersection and (c) a generated circle obtained from the one or more generated contours, objects (e.g., first set of object and second set of objects—refer below description), (v) defects, (vi) defect categories, (vii) information pertaining to how change in liquid level (e.g., water level) is detected, (viii) severity score computed for each defect, etc. The database 108 further comprises various techniques (e.g., frames extraction/selection and/or filtering technique, dehazing technique(s), liquid (e.g., water) bank identification technique(s), contour generation technique(s), pose estimation technique(s), object identification technique for identification of the first set and second set of objects, defect identification and classification technique(s), semantic segmentation technique(s), classification model(s)/machine learning model(s), pre-processing filter(s), thresholding technique(s), transformation technique(s) and the like which when executed enable the system of the present disclosure to perform method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
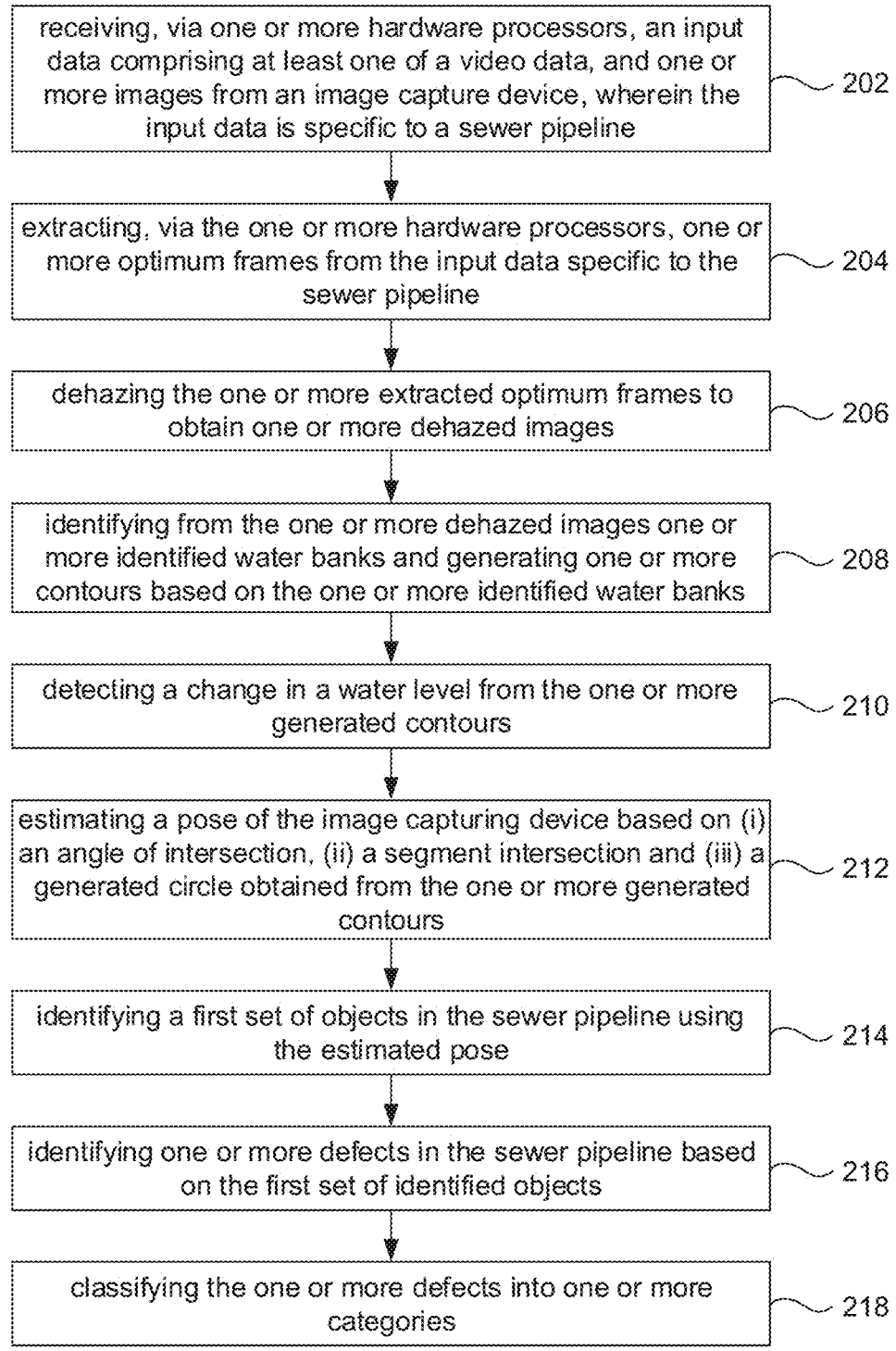
FIG. 2 depicts a flow-diagram illustrating a method for identifying defect types in liquid pipelines for classification and computing severity thereof, using the system of FIG. 1, in accordance with an embodiment of the present disclosure.
Figure 3:
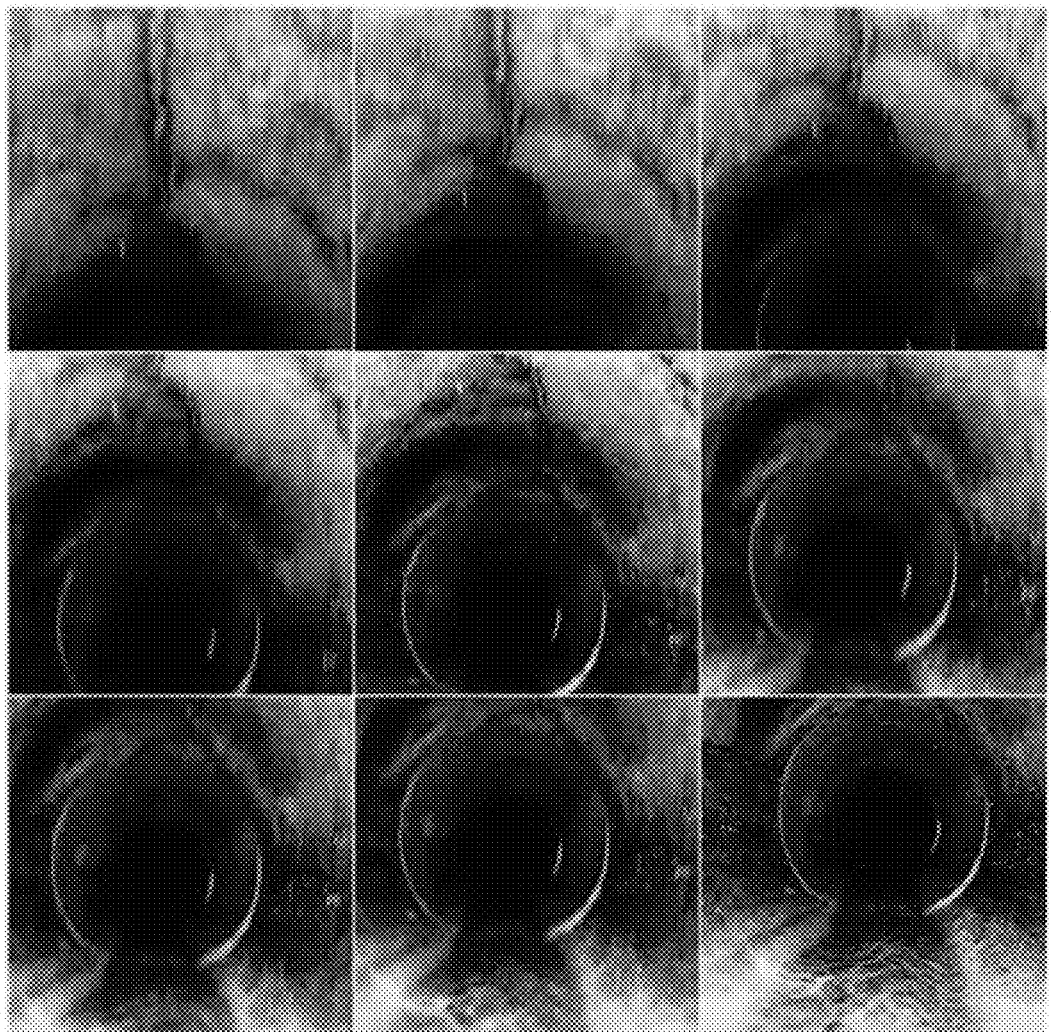
FIG. 3 depicts a set of images serving as an input data to the system of FIG. 1, the set of images being specific to a liquid pipeline (e.g., sewer pipeline), in accordance with an embodiment of the present disclosure.

FIG. 2, with reference to FIG. 1, depicts a flow-diagram illustrating a method for identifying defect types in liquid pipelines for classification and computing severity thereof, using the system 100 of FIG. 1, in accordance with an embodiment of the present disclosure. In an embodiment, the system 100 comprises one or more data storage devices or the memory 102 operatively coupled to the one or more hardware processors and are configured to store instructions for execution of steps of the method by the one or more processors 104. The steps of the method of the present disclosure will now be explained with reference to components of the system 100 of FIG. 1, FIG. 2, the flow diagram as depicted in FIG. 2 and other depictions of FIGS. 3 through 12D. In an embodiment, at step 202 of the present disclosure, the one or more hardware processors 104 receive an input data comprising at least one of a video data, and one or more images from an image capture device, wherein the input data is specific to a liquid pipeline. A liquid pipeline may also be referred as a pipeline and may be interchangeably used herein, in one embodiment. Such pipeline may be of a transmission pipeline type, a distribution pipeline type and so on. A liquid pipeline of the above pipeline types can be referred as a pipeline of mains and/or service lines that move liquid (e.g., clean water, oil, natural gas and the like) to individual homes and businesses/entities, at relatively low pressures. Other pipeline types include fluid pipelines, sewer pipelines. Examples of fluid pipelines include pipeline comprising multiple liquid composition such as crude oil, petroleum products and the like. Sewer pipeline refer to a pipeline wherein pipe convey sewage from an individual building/premise (or a set of buildings) to a common gravity sewer line. FIG. 3, with reference to FIGS. 1-2, depicts a set of images serving as an input data to the system 100 of FIG. 1, the set of images being specific to the liquid pipeline (e.g., sewer pipeline), in accordance with an embodiment of the present disclosure. In an embodiment of the present disclosure, images of a sewer pipeline are considered for better understanding of the embodiments described herein and such examples shall not be construed as limiting the scope of the present disclosure. Images of the sewer pipeline serving as an input data for the system and method of the present disclosure are obtained from available dataset source (e.g., refer https://marketplace.wessexwater.co.uk/dataset).

In an embodiment, at step 204 of the present disclosure, the one or more hardware processors 104 extract one or more optimum frames (also referred as 'best frames' and may be interchangeably used hereinafter) from the input data specific to the liquid pipeline.

In case the input is received in the form of the video data, anomalous frames (also referred as frames and interchangeably used herein) and corresponding log files are extracted from the video data wherein the frames are stored in various defect folders comprised in the database 108 of the memory 102. More specifically, input may comprise a set of video data wherein multiple videos of the sewer pipeline may be received. Based on corresponding log file(s), appropriate video data is/are selected for frames extraction. Further, the log file and video data are validated wherein delay is created for time and distance using delay creation technique(s) as known in the art. Further, information from the log file is fetched and specific frames are extracted from the video data.

Amongst the extracted frames, the one or more optimum/best frames are extracted. For instance, consider a video data serving as an input. The specific frames which were extracted as mentioned above are then fed as an input to a frame selection/filtering technique (e.g., filtering technique (s) as known in the art) wherein the frame selection/filtering technique outputs a set of selected frames. Further, one or more parameters such as average luminescence level, contrast level and blur index are estimated and based on the estimated parameters the one or more optimum/best frames are selected. More specifically, weighted sum of the estimated parameters is used to extract the one or more optimum/best frames. Additionally, survey metadata information from initial frames and camera distance from start in all subsequent frames are extracted by the system 100, in one example embodiment.

Figure 4:
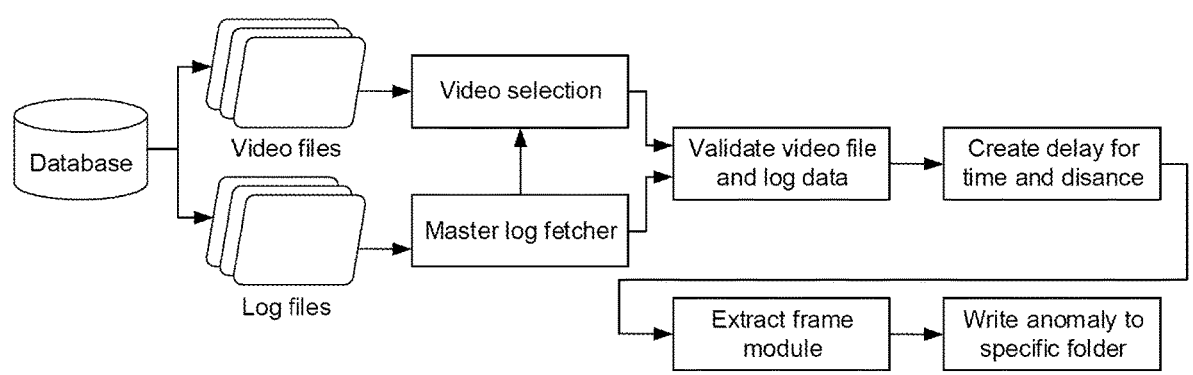
FIG. 4 depicts a block diagram illustrating a method for frames extraction from the input data, using the system of FIG. 1, in accordance with an embodiment of the present disclosure.
Figure 5:
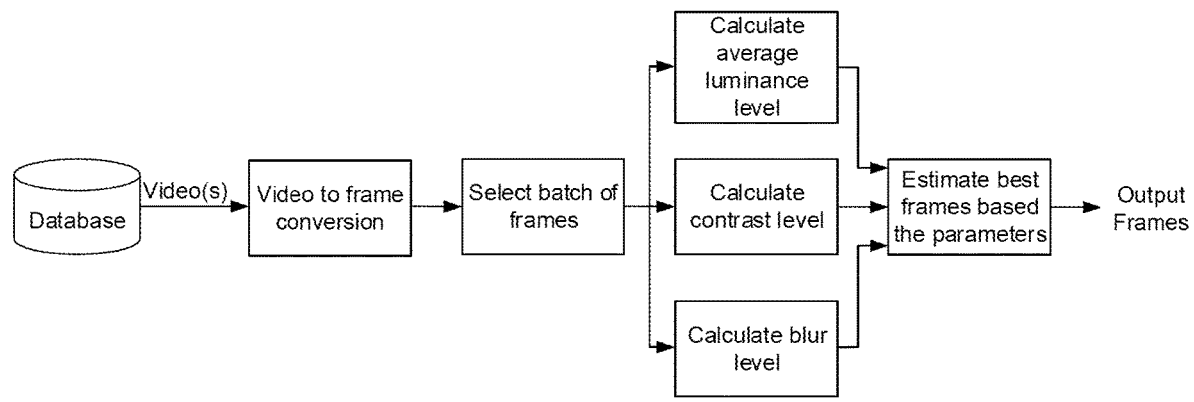
FIG. 5 depicts a block diagram illustrating a method for extracting and selecting of one or more optimum frames from the input data, using the system of FIG. 1, in accordance with an embodiment of the present disclosure.
Figure 6:
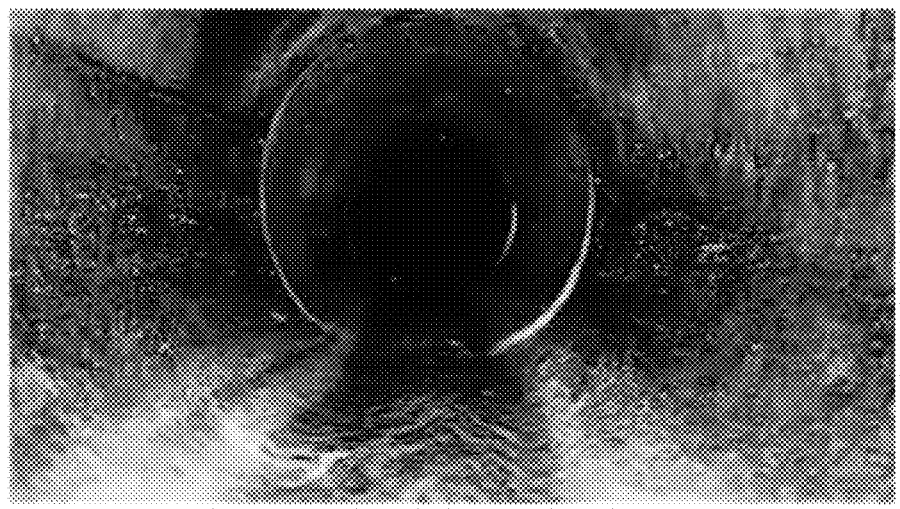
FIG. 6 depicts one or more optimum frames extracted from the input data, using the system of FIG. 1, in accordance with an embodiment of the present disclosure.

FIG. 4, with reference to FIGS. 1 through 3, depicts a block diagram illustrating a method for frames extraction from the input data, using the system 100 of FIG. 1, in accordance with an embodiment of the present disclosure. FIG. 5, with reference to FIGS. 1 through 4, depicts a block diagram illustrating a method for extracting and selecting of one or more optimum frames from the input data, using the system 100 of FIG. 1, in accordance with an embodiment of the present disclosure. FIG. 6, with reference to FIGS. 1 through 5, depicts one or more optimum frames extracted from the input data, using the system 100 of FIG. 1, in accordance with an embodiment of the present disclosure.

Referring to steps of FIG. 2, in an embodiment, at step 206 of the present disclosure, the one or more hardware processors 104 dehaze the one or more extracted optimum frames to obtain one or more dehazed images. It is imperative to improve the visibility for a given video/image(s) captured inside sewage water pipelines under challenging conditions such as non-uniform haze, non-uniform illumination due to artificial light sources and dynamic turbid water. This step is important because haze is primarily due to the light reflected by the medium back to the image capturing device (e.g., camera). Also, the light reflected by scene element(s) are partially absorbed by the medium itself. This leads to loss of contrast in the captured video/image and it is difficult to navigate the liquid pipelines (such as sewer pipelines, oil pipeline, natural gas pipeline, crude oil pipeline and the like). By dehazing the one or more extracted optimum frames, the one or more dehazed images are obtained thereby enhancing the quality of the frames which can improve the accuracy of tasks like detecting cracks, sediments, etc., in one example embodiment. More specifically, the step of dehazing the one or more extracted optimum frames to obtain the one or more dehazed images include: extracting one or more local properties, such as opacity and air-light for each pixel in the frames (or performing local properties extraction at a pixel level), wherein extraction of the one or more local properties results in obtaining an opacity map. The opacity map is smoothened wherein haze free images/videos are extracted from the smoothened opacity map. FIGS. 7A through 7D, with reference to FIGS. 1 through 6, depict the one or more dehazed images outputted by the system 100 of FIG. 1, in accordance with an embodiment of the present disclosure.

Figure 8:
FIG. 8 depicts an image with one or more identified liquid banks (water banks) and contours generated thereof, using the system of FIG. 1, in accordance with an embodiment of the present disclosure.

Referring to steps of FIG. 2, in an embodiment, at step 208 of the present disclosure, the one or more hardware processors 104 identify, from the one or more dehazed images, one or more liquid banks (water banks) and generate one or more contours based on the one or more identified liquid banks (e.g., the one or more identified water banks. One or more areas of liquid touching the banks of the liquid pipeline (e.g., sewer pipeline, oil pipeline, natural gas pipeline, crude oil pipeline and the like) are detected which are indicative of the liquid banks (or portion of the pipeline alongside or where liquid deposit can be found is referred as liquid bank). In other words, one or more areas of liquid such as water touching the banks of the sewer pipeline are detected which are indicative of the water banks (or portion of the pipeline alongside or where water deposit can be found is referred as water bank). Further, one or more areas of liquid such as oil touching the banks of the pipeline are detected which are indicative of the oil banks (or portion of the pipeline alongside or where oil deposit can be found is referred as oil bank). FIG. 8, with reference to FIGS. 1 through 7D, depicts an image with the one or more identified liquid banks (e.g., water banks) and contours generated thereof, using the system 100 of FIG. 1, in accordance with an embodiment of the present disclosure. More specifically, FIG. 8, with reference to FIGS. 1 through 7D, depicts an image with the one or more identified water banks and contours generated thereof, using the system 100 of FIG. 1, in accordance with an embodiment of the present disclosure.

Referring to steps of FIG. 2, in an embodiment, at step 210 of the present disclosure, the one or more hardware processors 104 detect a change in a liquid level from the one or more generated contours. Liquid level change detection helps get an accurate assessment of the functional health of pipelines (also referred as pipes and may be interchangeably used herein) and is totally reliant on image-based methods as compared to current flow/pressure-based methods. For instance, water level change detection in sewer pipeline, water pipeline and the like helps get an accurate assessment of the functional health of pipelines (also referred as pipes and may be interchangeably used herein) and is totally reliant on image-based methods as compared to current flow/pressure-based methods. It involves performing (i) zoning to determine region of interest, (ii) semantic segmentation to distinguish liquid (e.g., water) boundary from pipe, (iii) determining the intersection of boundary lines and (iv) measuring the included angle to know the proportion vis-à-vis the circumference. Also, in the present disclosure, the process discards non-standard lines which are off-center and progressively measures the change in angle beyond a threshold. Detection of liquid level (or water level) helps in detection of the center (vanishing point in the image). Relative depth can also be estimated with this approach, which can be useful in many use-cases (e.g., detect pose of the camera leveraging liquid line (or water line), liquid/water detection using visual sensor in confined noisy environment, etc.).

Figure 9A:
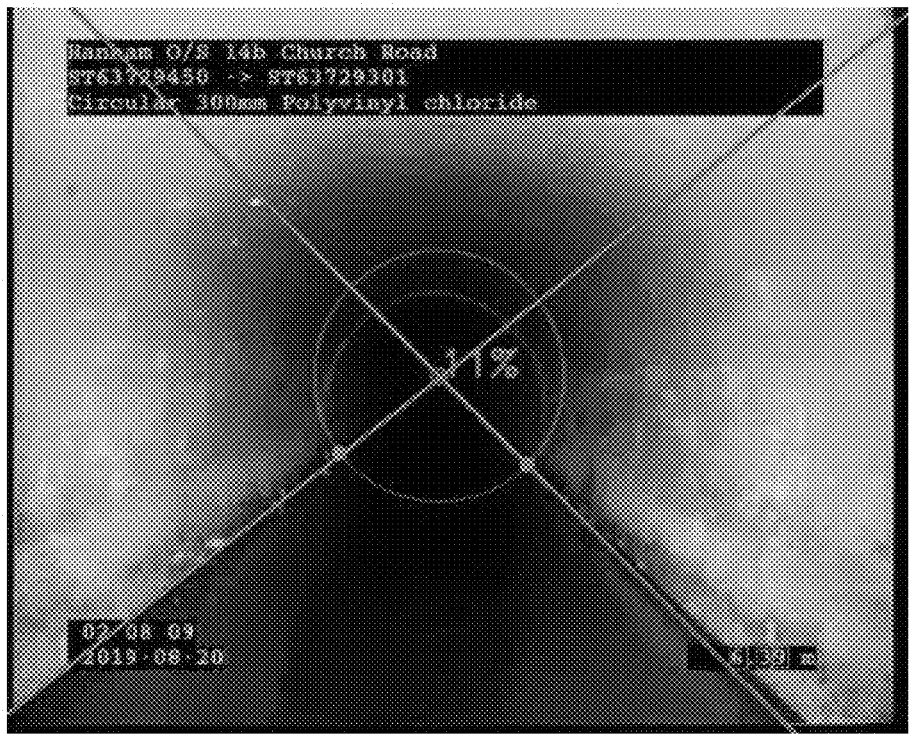
FIGS. 9A-9B depict an image with a change in a liquid level being detected from the one or more generated contours, using the system of FIG. 1, in accordance with an embodiment of the present disclosure.
Figure 9B:

The step of detecting a change in a liquid level (or water level from water pipeline/sewer pipeline, oil level in oil pipelines) from the one or more generated contours comprises fitting two or more lines in each of the one or more generated contours; determining one or more intersection points of the two or more lines; calculating an angle of intersection and generating a circle with radius R using the one or more intersection points of the two or more lines; calculating a segment intersection using the angle of intersection and the generated circle; and detecting the change in the liquid level based on the segment intersection. Line fitting (e.g., geometry line fit technique) is performed in each of the one or more generated contours to identify an angle a line could fit. Further, the one or more intersection points of the two or more lines are determined wherein (i) an angle of intersection is calculated and (ii) a circle with radius R is generated using the one or more intersection points of the two or more lines. Further, a segment intersection is calculated using the angle of intersection and the generated circle. Using the segment intersection, the change in the liquid level is detected. In other words, best fit lines are determined for the liquid bank contours detected by segmentation model and then intersection point of these lines is determined. Further, angle of intersection is calculated and a circle around intersection point is generated. Circle is a heuristic for diameter of the pipe and the angle of intersection approximates the segment covered by liquid. Area of segment of intersection point with the circle is calculated and liquid level in percentage is derived. Percentages of liquid level across multiple frames is tracked. If there is +/−5% change in liquid level in given frame with respect to base frame, then that specific frame is identified and that is classified as liquid level change. The above description constitutes heuristic(s) for detecting change in liquid level in pipelines, in one example embodiment of the present disclosure. For example consider the liquid in the sewer pipeline as water, then detecting a change in a water level (or water level from water pipeline/sewer pipeline) from the one or more generated contours comprises fitting two or more lines in each of the one or more generated contours; determining one or more intersection points of the two or more lines; calculating an angle of intersection and generating a circle with radius R using the one or more intersection points of the two or more lines; calculating a segment intersection using the angle of intersection and the generated circle; and detecting the change in the water level based on the segment intersection. Line fitting (e.g., geometry line fit technique) is performed in each of the one or more generated contours to identify an angle a line could fit. Further, the one or more intersection points of the two or more lines are determined wherein (i) an angle of intersection is calculated and (ii) a circle with radius R is generated using the one or more intersection points of the two or more lines. Further, a segment intersection is calculated using the angle of intersection and the generated circle. Using the segment intersection, the change in the water level is detected. In other words, best fit lines are determined for the water bank contours detected by segmentation model and then intersection point of these lines is determined. Further, angle of intersection is calculated and a circle around intersection point is generated. Circle is a heuristic for diameter of the pipe and the angle of intersection approximates the segment covered by liquid. Area of segment of intersection point with the circle is calculated and water level in percentage is derived. Percentages of liquid level across multiple frames is tracked. If there is +/−5% change in water level in given frame with respect to base frame, then that specific frame is identified and that is classified as water level change. FIGS. 9A-9B, with reference to FIGS. 1 through 8, depict an image with a change in a liquid level (e.g., water level) being detected from the one or more generated contours, using the system 100 of FIG. 1, in accordance with an embodiment of the present disclosure. The above approach described herein for change in water level detection can be applied for other liquid types (e.g., oil, natural gas) and other fluid types (e.g., crude oil/petroleum products, etc.) as well by implementation of the systems and methods of the present disclosure.

Figure 10:
FIG. 10 depicts an image illustrating a pose of an image capturing device being estimated, using the system of FIG. 1, in accordance with an embodiment of the present disclosure.

Referring to steps of FIG. 2, in an embodiment, at step 212 of the present disclosure, the one or more hardware processors 104 estimate a pose of the image capturing device based on (i) an angle of intersection, (ii) a segment intersection and (iii) a generated circle obtained from the one or more generated contours. Pose of the camera/image capturing device can be estimated by leveraging liquid (e.g., water) line, wherein water detection is performed using visual sensor(s) in confined noisy environment. More specifically, the pose of the image capturing device is estimated based on a deviation in an angle between the segment intersection and the generated circle obtained from the one or more generated contours, in one embodiment of the present disclosure. FIG. 10, with reference to FIGS. 1 through 9B, depicts an image illustrating a pose of an image capturing device being estimated, using the system of FIG. 1, in accordance with an embodiment of the present disclosure.

Figure 11A:
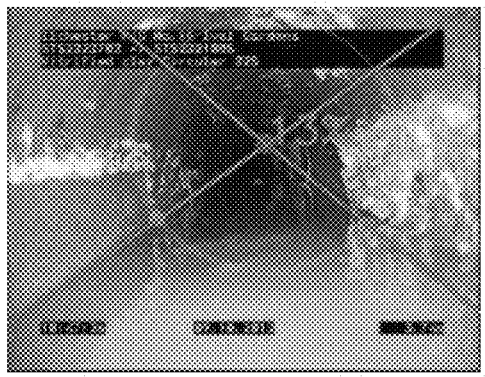
FIGS. 11A through 11D depict a set of images illustrating the first set of objects being identified in the liquid pipeline (e.g., sewer pipeline), using the system of FIG. 1, in accordance with an embodiment of the present disclosure.
Figure 11B:
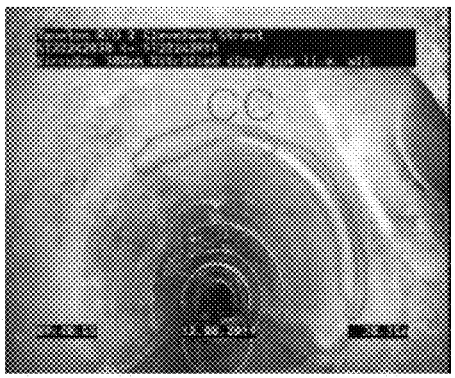
Figure 11C:
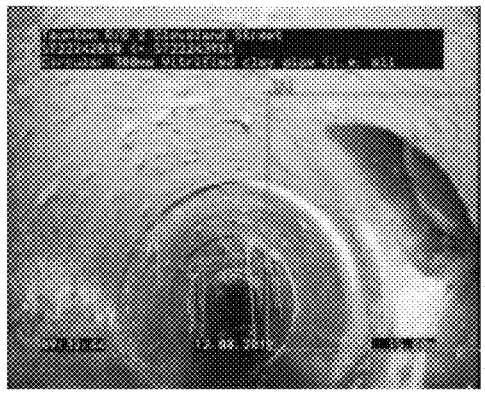
Figure 11D:
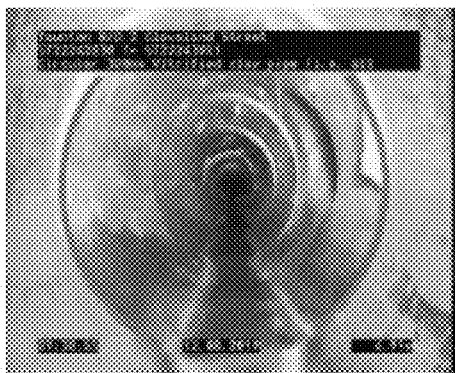
Figure 12A:
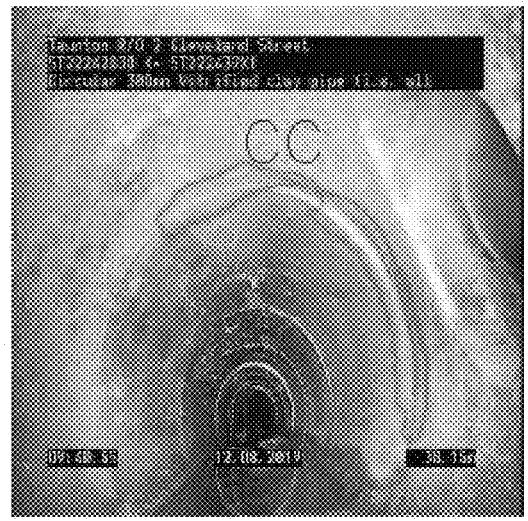
FIGS. 12A through 12D depict a set of images illustrating one or more defects being identified in the liquid pipeline (e.g., sewer pipeline) based on the first set of identified objects and classified in one or more categories, using the system of FIG. 1, in accordance with an embodiment of the present disclosure.
Figure 12B:
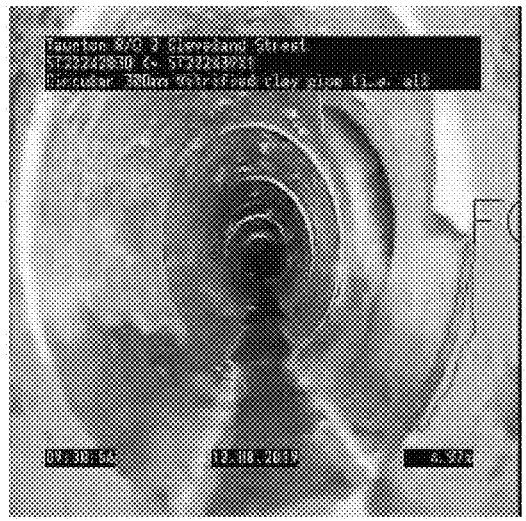
Figure 12C:
Figure 12D:

Referring to steps of FIG. 2, in an embodiment, at step 214 of the present disclosure, the one or more hardware processors 104 identify a first set of objects in the liquid pipeline using the estimated pose. FIGS. 11A through 11D, with reference to FIGS. 1 through 10, depict a set of images illustrating the first set of objects being identified in the liquid pipeline (e.g., sewer pipeline), using the system 100 of FIG. 1, in accordance with an embodiment of the present disclosure. More specifically, FIGS. 11A through 11D, with reference to FIGS. 1 through 10, depict a set of images illustrating the first set of objects being identified in the sewer pipeline, using the system 100 of FIG. 1, in accordance with an embodiment of the present disclosure. The first set of identified objects are at least one of a structural object type and a functional object type, in one embodiment of the present disclosure. One of the first set of identified objects is depicted in FIG. 11B illustrating a curve like labeling in gray line representation, in one example embodiment of the present disclosure. Another identified object includes a white color like deposit on the right side of the pipeline as depicted in FIG. 11D, in another example embodiment of the present disclosure. Below Table 1 depicts exemplary first set of identified objects classified as a structural object type and/or a functional object type.

TABLE 1

| Category | Type |
| --- | --- |
| Junction and Connection | Structural |
| Floating Deposit | Functional |
| Root Mass | Functional |
| Liquid/fluid (water, oil, gas) Level | Functional |
| Cracks & Fractures | Structural |
| Attached Deposit - Greasing | Functional |
| Attached Deposit - Fouling | Functional |
| Junction Closed | Structural |
| Manholes | Structural |

In an embodiment, at step 216 of the present disclosure, the one or more hardware processors 104 identify one or more defects in the liquid pipeline (e.g., sewer pipeline, oil pipeline, natural gas pipeline, crude oil pipeline and the like) based on the first set of identified objects. Referring to steps of FIG. 2, in an embodiment, at step 218 of the present disclosure, the one or more hardware processors 104 classify the one or more defects into one or more categories. FIGS. 12A through 12D, with reference to FIGS. 1 through 11D, depict a set of images illustrating the one or more defects being identified in the liquid pipeline (e.g., sewer pipeline) based on the first set of identified objects and classified in one or more categories, using the system 100 of FIG. 1, in accordance with an embodiment of the present disclosure. More specifically, FIGS. 12A through 12D, with reference to FIGS. 1 through 11D, depict a set of images illustrating the one or more defects being identified in the sewer pipeline based on the first set of identified objects and classified in one or more categories, using the system 100 of FIG. 1, in accordance with an embodiment of the present disclosure. The one or more defects are classified into the one or more categories such as, at least one of (a) one or more fractures, (b) one or more breaks, (c) one or more cracks. The one or more defects are identified as at least one of (a) one or more fractures, (b) one or more breaks, (c) one or more cracks based on a defect ratio area, in one example embodiment. For instance, fracture/cracks can be observed in FIGS. 12C and 12D, in one example embodiment. The one or more defects are identified using a semantic segmentation technique (as known in the art technique), in one example embodiment.

Where one or more defects from the above mentioned defects are identified in the images/frames, that frame is masked and further refined to obtain a refined detected mask frame, wherein refining is performed to remove unnecessary noise comprised in the detected mask of the frame. Once the refined detected mask frame is obtained, various defect parameters are estimated/calculated for the one or more defects being identified/detected. The various parameters estimated/calculated include, for example, but are not limited to, rectangle area, defect area ratio by performing contour fitting, rectangle fitting like techniques as known in the art. Based on the various defect parameters, it is checked whether a defect corresponds to a specific defect category/defect type. For instance, a defect is checked if it belongs to a break defect category. If it is a yes, then the defect is classified under break defect category. If defect does not belong to a break defect category (if No), then the defect is further checked if it belongs to a fracture defect category. If the defect is identified to be belonging to the fracture defect category, it is further checked whether the defect has multiple cracks/fractures. Else if no, it is further checked whether the defect is of a crack defect category. If multiple cracks/fractures are identified (if Yes), then the defect is classified under multiple cracks or multiple fractures category. If the defect does not have any multiple cracks/fractures (if No), then it is further checked whether it is a circumferential or a longitudinal defect and accordingly the defect is classified under say either circumferential/longitudinal crack defect category or circumferential/longitudinal fracture defect category. If the defect is a crack defect category, it is checked for whether the defect is circumferential or longitudinal defect category type and is accordingly categorized by the system 100 of FIG. 1. In other words, region(s) of interest in the frame are identified from the segmentation step wherein contour fitting and best rectangle fitting is performed around it. Rectangle area and contour area are calculated, and defect area ratio is derived accordingly. Using predefined thresholds (e.g., thresholding technique) to classify if the defect contour is a crack, a fracture or a break. Rectangle aspect ratio is used to classify orientation of the defect contour such as longitudinal or circumferential and the like, in one example embodiment of the present disclosure. Further, number of instances of defective contours in frame are determined to classify the defect as single or multiple instances. The above description constitutes heuristic(s) for detecting crack and/or fracture defect types in pipelines, in one example embodiment of the present disclosure. Defect(s) identified around a wall of the liquid pipeline (e.g., sewer pipeline, oil pipeline, natural gas pipeline, crude oil/fluid pipeline and the like) are classified as one of (i) a longitudinal defect type or (ii) a circumferential defect type, in one example embodiment of the present disclosure. Defect(s) identified around one or more junctions of the liquid pipeline (e.g., sewer pipeline, oil pipeline, natural gas pipeline, crude oil pipeline and the like) are classified as one or more junction types (e.g., a blocked junction, a semi-blocked junction, an unblocked junction. The defects identified around the one or more junctions of the liquid pipeline (e.g., sewer pipeline, oil pipeline, natural gas pipeline, crude oil pipeline and the like) are based on a change in structural position of the one or more junctions, in one example embodiment of the present disclosure. Below Table 2 depicts example junction defects and corresponding description:

TABLE 2

| Type of Junction Defect | Description |
|---|---|
| Incorrect Position | Position is either in lower half of pipe or is against the flow - Classified with respect to pose |
| Intruding | JN/CN (junction/connection or connects) intruding into the pipeline (or intruding into the sewer) |
| Damaged | There are breakages or other defects around JN/CN |
| Blocked | JN/CN is blocked |

Once the defects are identified/categorized, the one or more hardware processors 104 compute a severity of the one or more identify defect types based on a location associated therewith.

Further, the one or more hardware processors 104 detect, using a classification model, a second set of objects that are different from the first set of objects; pre-process the second set of objects to obtain a set of pre-processed objects; apply a set of domain-based rules on the pre-processed objects to obtain at least a subset of the set of pre-processed objects; and classify the subset of the set of pre-processed objects. The objects from the first set and the second set include but are not limited to, liquid pipeline (e.g., sewer pipeline, oil pipeline, natural gas pipeline, crude oil pipeline and the like) area, junctions, joints, liquid/fluid level, connections, roots and fractures/Displacements, holes and spalling, and the like. More specifically, joint(s), displacement(s) is categorized/classified as second set of objects. Further, liquid/fluid level is classified/categorized under the first set of objects and change in liquid/fluid level is classified/categorized under the second set of objects, in one example embodiment of the present disclosure. Below Table 3 depicts various objects and domain-based rules being illustrated by way of examples:

TABLE 3

| Object | Domain Based Rule(s) |
|---|---|
| liquid/fluid (e.g., water as liquid) Level | Level changes beyond 5% will be tracked - Rise in level can indicate blockages and dips can indicate leakages |
| Junction/Connection | Will be subclassified based on position and diameter - 3 o' clock/9 o' 'clock position and larger diameter indicate Junction else Connection |
| Joints | Defects close to Joints (<0.2 m) will be classified as Joint Defect to help prioritize maintenance |

TABLE 3-continued

| Object | Domain Based Rule(s) |
| --- | --- |
| Roots and Fractures/ Displacements | Combination Rule - Presence of roots indicate fracture/displacement in pipes as well |
| Holes and Spalling | Combination Rule - Presence of holes is usually accompanied by spalling on the surrounding wall portion |
| Generic | Defects extending beyond 1 m are tracked as continuous defects to help prioritize maintenance |
| Generic | Surveys typically start at one manhole and finish at the next manhole, so all defects identified lie between start and finish manholes |

The steps of detecting/identifying junctions/connects are better understood by way of following description:

Systems and methods of the present disclosure implement a deep learning region bound approach for predicting/detecting the presence of junctions and connections in a frame. The one or more optimum/best frames extracted from the input data serve as an input for predicting/detecting the presence of junctions and connections in a frame, wherein a pre-trained model file (as known in the art) is utilized as an additional input. Regions of interests (RoIs) are identified and image pose is corrected considering the rotation of the image capturing device, wherein for a given frame/image, the pose for the image capturing device is provided as input. Once the pose of the image capturing device is corrected, (i) diameter of the detected/identified RoIs and (ii) projection angle of junction(s)/connection(s) are calculated. Based on the calculated diameter and the projection angle, a corresponding RoI is categorized/classified as either a junction or a connection. More specifically, the RoIs are classified into junction or connection using heuristics based on material, size and orientation of the object in frame(s). This improves the method of the present disclosure by going beyond mere detection and actually sub-classifying them further as closed/blocked junctions, defective junctions and the like using granular classifiers (e.g., trained classifiers such as support vector machine, random forest, and the like).

In an embodiment, one or more joints are identified in the liquid pipeline (e.g., sewer pipeline, oil pipeline, natural gas pipeline, crude oil pipeline and the like) based on the extracted one or more optimal frames using a set of filters by: segmenting wall of the liquid pipeline (e.g., sewer pipeline, oil pipeline, natural gas pipeline, crude oil pipeline and the like) into one or more regions using a semantic segmentation technique (as known in the art technique) to obtain a plurality of regions of interest; applying a first pre-processing filter on the plurality of regions of interest to obtain a plurality of pre-processed regions of interest; applying, (i) a second pre-processing filter and (ii) a thresholding technique on the plurality of pre-processed regions of interest to obtain at least a subset of regions of interests; and applying a transformation technique on the subset of regions of interests to identify the one or more joints. More specifically, the one or more joints are identified in the liquid pipeline (e.g., sewer pipeline, oil pipeline, natural gas pipeline, crude oil pipeline and the like) based on the extracted one or more optimal frames using the set of filters by: segmenting wall regions of the liquid pipeline (e.g., sewer pipeline, oil pipeline, natural gas pipeline, crude oil pipeline and the like) using semantic segmentation technique to get the regions of interest; applying a pre-designed max-contrast filter (e.g., a first pre-processing filter) for enhancing the regions of interest; applying a pre-designed dark channel filter (e.g., a second pre-processing filter) and thresholding to get a subset of regions of interest, specifically the shadowed region and applying circle/oval detection algorithm (such as Hough transform) to detect the joints.

In other words, consider a sewer pipeline, wherein an image is captured and frames are pre-processed wherein quality of frames is analyzed and frames with best quality is passed to further processing. The frames also undergo some cropping, resizing to ease the processing required in further steps. One or more multiple filtering techniques are used to extract features of interest that helps to distinguish between junction(s) in the image verses the other regions. Further, max-contrast filter and dark channel filter comprised in the memory 102 are invoked and executed by the system 100 wherein each frame/image undergoes both these filters in sequence and the features are extracted. The output of these steps results in a feature image of same dimension as input. Further, appropriate thresholding is required to correctly distinguish the region of interest versus the other image areas. This is done on the extracted features from the previous step. Furthermore, Hough transforms are used to detect circle in the binary image generated from the thresholding step, wherein the result of performing Hough transformation is a binary output based on the presence of joint in the circle. The above steps enable identifying concentration of defects closer to pipe joints to help prioritize maintenance efforts.

It is to be understood by a person having ordinary skill in the art or person skilled in the art that though the present disclosure describes examples of sewer pipeline(s), the systems and methods of the present disclosure can be implemented for any pipeline (e.g., water, oil, gas, crude oil/fluid and the like) including transmission and distribution pipelines as mentioned above and such examples shall not be construed as limiting the scope of the present disclosure. Similarly, it is to be understood by a person having ordinary skill in the art or person skilled in the art that though the present disclosure describes examples of first set and second set of objects has mentioned above, such examples of objects shall not be construed as limiting the scope of the present disclosure.

Once (i) the defects are identified/detected and categorized, (ii) severity for each defect is computed, the defect log serving as an output from all components of the system 100 are consolidated and header information such as manhole and water level at distance zero are marked. Further, water levels are processed wherein water levels with +/−x % (e.g., value of 'x' is 5 based on experiments conducted by the systems and methods of the present disclosure) are noted. It is to be understood by a person having ordinary skill in the art or person skilled in the art that the value of 'x' as +/−5% shall not be construed as limiting the scope of the present disclosure. Identical frames are discarded if the frames are less than by a distance 'a' meter apart (e.g., value of 'a' is 0.2 based on experiments conducted by the systems and methods of the present disclosure). It is to be understood by a person having ordinary skill in the art or person skilled in the art that the value of 'a' as 0.2 shall not be construed as limiting the scope of the present disclosure. Defects that are within 'y' meter or joint(s) are noted for further analysis and processing (e.g., value of 'y' is 0.2 based on experiments conducted by the systems and methods of the present disclosure). It is to be understood by a person having ordinary skill in the art or person skilled in the art that the value of 'y' as 0.2 shall not be construed as limiting the scope of the present disclosure. Further, recurring defects or defects of same type are noted. For instance, identical defects within 1-meter length are noted for further analysis and processing. Furthermore, manhole closest to the end of liquid pipeline (e.g., sewer pipeline, oil pipeline, natural gas pipeline, crude oil pipeline and the like) is marked as a finish node. An analytical report is generated by the system 100 by sequencing the outputs of each steps or by sorting defects based on an associated distance.

Embodiments of the present disclosure enable users to upload images/videos of liquid pipeline (e.g., sewer pipelines, oil pipeline, natural gas pipeline, crude oil pipeline and the like serving as an input), wherein defect log information may be processed by the system 100 by implementing artificial intelligence-based techniques (as known in the art). Segments of interests are automatically identified and are further validated. The validation of the segments of interests may be performed by the system 100 by (i) using historical pattern of defects in liquid pipelines (e.g., sewer pipelines, oil pipeline, natural gas pipeline, crude oil pipeline and the like) inspected in the past, or (ii) obtaining one or more inputs from users (e.g., authorities). A report may be further generated, and the input may be marked as complete based on a review and validation of the segments. The defects in the report may be validated (e.g., by a user) and new defect types can be obtained from the users. A dashboard may be generated by the system 100 for users wherein global defect counts across all sites category wise may be made available to users for viewing and sharing inputs. The dashboard and data comprising in the dashboard may be further analyzed for comparison of sites which can be provided to users for viewing and analysis. Such comparison of sites may be generated by the system 100 upon selection of sites (wherein inputs may be received from users that depict selection of sites for comparison). The dashboard is further provided with other options wherein the users can select to view a drill down analysis of sites and pipelines. The system 100 further enables users to change system recommended priority for sites for various reasons (e.g., business reasons). Based on this, the workforce available and assignment can be reviewed by various stakeholders of the authorities and enable optimized maintenance schedule for priority sites.

Embodiments of the present disclosure provide systems and methods that implement various techniques such as extraction of frames from input data (e.g., video data, images and the like), pre-processing the extracted frames by apply zoning, segmentation and frame filters to select best high quality frames, and the like. The systems and methods of the present disclosure may further use additional use case specific pre-processing and domain knowledge to identify the key frames for different streams of classifiers. Further, the method includes processing step which includes extraction of meta-data about the survey from the corresponding video and frame data, loading pre-trained Artificial Intelligence, Deep Learning/Machine Learning (DL/ML) models comprised in the memory 102, computer vision (CV) techniques for detecting anomalies corresponding to different use cases such as manhole, liquid/fluid (e.g., water as liquid example) level, junction/connection, cracks/fractures/breaks, roots/holes, attached/floating deposits, and the like. Further, the method of the present disclosure includes model (DL/ML) training that involves extracting data from videos, segregating them into train and test sets, annotating them with the class labels from the log provided, training them to detect frame/object level defects, as the case may be and test them using the validation set. The systems and method of the present disclosure make use of hierarchical classification scheme where category classification is required before granular sub-classification of object or anomaly can be derived. Heuristics based algorithms (as known in the art are further implemented and applied by the systems and methods of the present disclosure for measuring the liquid/fluid (e.g., water as liquid example) level changes and in identification of Cracks/Fractures to determine instance counts and orientation. The present disclosure enables applying quantitative classification for specific defect classes to determine the severity and associated risk. The method of the present disclosure further includes Post-processing technique wherein after the multiple pass classification and scoring, frames are collated at post processing level for anomaly consolidation/rationalization/determination of severity. At the post-processing level, domain-based rules are applied for granular classification, elimination of duplicates, false positives, identifying structural defects around joints and qualifying continuous defects, and the like. As mentioned above, reports may be generated by the system 100 (e.g., comma-separated values (CSV), Extensible Markup Language (XML) format, and the like) based on consolidated defect list and the same is stored in the memory 102.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   receiving, via one or more hardware processors, an input data comprising at least one of a video data, and one or more images from an image capture device, wherein the input data is specific to a liquid pipeline of a transmission pipeline type, a distribution pipeline type;
   extracting, via the one or more hardware processors, one or more optimum frames from the input data specific to the liquid pipeline upon estimating parameters including average luminescence level, a contrast level, and a blur index;
   dehazing the one or more extracted optimum frames to obtain one or more dehazed images by extracting one or more local properties of opacity and air-light for each pixel in the extracted optimum frames, wherein the extraction of the local properties results in obtaining an opacity map that is smoothened to extract haze free images;
   identifying, from the one or more dehazed images, one or more identified liquid banks and generating one or more contours based on the one or more identified liquid banks;
   detecting a change in a liquid level from the one or more generated contours;
   estimating a pose of the image capturing device based on (i) an angle of intersection, (ii) a segment intersection, and (iii) a generated circle obtained from the one or more generated contours using a visual sensor in confined noisy environment, and the segment intersection is calculated using angle of intersection and the generated circle obtained from one or more generated contours;
   identifying a first set of objects in the liquid pipeline using the estimated pose;
   identifying one or more defects in the liquid pipeline based on the first set of identified objects; and
   classifying the one or more defects into one or more categories, wherein the step of classifying including identifying region of interests (ROIs) and correcting image pose considering rotation of the image capturing device, wherein once the pose of the image capturing device is corrected, (i) diameter of detected or identified ROIs and (ii) projection angle of junction(s) or connection (s) are calculated followed by classifying the ROI as either a junction or a connection using heuristics based on material, size, and orientation of the first set of objects in frame(s).

2. The processor implemented method of claim 1, wherein the step of detecting a change in a liquid level from the one or more generated contours comprises:
   fitting two or more lines in each of the one or more generated contours;
   determining one or more intersection points of the two or more lines;
   calculating an angle of intersection and generating a circle with radius R using the one or more intersection points of the two or more lines, wherein the circle is a heuristic for diameter of the liquid pipeline and the angle of intersection approximates a segment covered by liquid;
   calculating a segment intersection using the angle of intersection and the generated circle, wherein an area of segment of intersection point with the generated circle is calculated and liquid level in percentage is derived; and
   detecting the change in the liquid level based on the segment intersection k tracking a percentage of liquid level across multiple frames and if exists a predefined percentage change in the liquid level in the frame with respect to a base frame, then that specific frame is identified and classified as liquid level change.

3. The processor implemented method of claim 1, wherein the one or more defects comprise at least one of (a) one or more fractures, (b) one or more breaks, and (c) one or more cracks, and wherein the one or more defects are identified as at least one of (a) the one or more fractures, (b) the one or more breaks, and (c) the one or more cracks based on a defect ratio area.

4. The processor implemented method of claim 1, wherein the one or more defects are identified using a semantic segmentation technique.

5. The processor implemented method of claim 1, further comprising computing a severity of the one or more identified defects based on a location associated therewith.

6. The processor implemented method of claim 1, wherein the first set of objects are at least one of a structural object type including junction and connection, and cracks and fractures and a functional object type.

7. The processor implemented method of claim 1, wherein the one or more defects identified around a wall of the liquid pipeline are classified as one of (i) a longitudinal defect type or (ii) a circumferential defect type.

8. The processor implemented method of claim 1, wherein the one or more defects identified around one or more junctions of the liquid pipeline are classified as one or more junction types, and wherein the one or more defects identified around the one or more junctions of the liquid pipeline are based on a change in structural position of the one or more junctions, wherein the one or more junction types includes incorrect position, intruding, damaged and blocked.

9. The processor implemented method of claim 1, further comprising:
   detecting, using a classification model, a second set of objects that are different from the first set of objects;
   pre-processing the second set of objects to obtain a set of pre-processed objects;
   applying a set of domain-based rules on the pre-processed objects to obtain at least a subset of the set of pre-processed objects; and
   classifying the subset of the set of pre-processed objects.

10. The processor implemented method of claim 1, wherein one or more joints are identified in the liquid pipeline based on the extracted one or more optimal frames using a set of filters by:
   segmenting wall of the liquid pipeline into one or more regions using a semantic segmentation technique to obtain a plurality of regions of interest;
   applying a first pre-processing filter on the plurality of regions of interest to obtain a plurality of pre-processed regions of interest;
   applying, (i) a second pre-processing filter and (ii) a thresholding technique on the plurality of pre-processed regions of interest to obtain at least a subset of regions of interests; and
   applying a transformation technique on the subset of regions of interests to identify the one or more joints.

11. A system, comprising:
   a memory storing instructions;
   one or more communication interfaces; and
   one or more hardware processors coupled to the memory via the one or more communication interfaces, wherein the one or more hardware processors are configured by the instructions to:
   receive an input data comprising at least one of a video data, and one or more images from an image capture device, wherein the input data is specific to a liquid pipeline of a transmission pipeline type, a distribution pipeline type;
   extract one or more optimum frames from the input data specific to the liquid pipeline upon estimating parameters including average luminescence level, a contrast level, and a blur index;
   dehaze the one or more extracted optimum frames to obtain one or more dehazed images by extracting one or more local properties of opacity and air-light for each pixel in the extracted optimum frames, wherein the extraction of the local properties results in obtaining an opacity map that is smoothened to extract haze free images;
   identify, from the one or more dehazed images, one or more identified liquid banks and generating one or more contours based on the one or more identified liquid banks;
   detect a change in a liquid level from the one or more generated contours;
   estimate a pose of the image capturing device based on (i) an angle of intersection, (ii) a segment intersection and (iii) a generated circle obtained from the one or more generated contours using a visual sensor in confined noisy environment and in the segment intersection is calculated using angle of intersection and the generated circle obtained from one or more generated contours;
   identify a first set of objects in the liquid pipeline using the estimated pose;
   identify one or more defects in the liquid pipeline based on the first set of identified objects; and
   classify the one or more defects into one or more categories, wherein the step of classifying including identifying region of interests (ROIs) and correcting image pose considering rotation of the image capturing device, wherein once the pose of the image capturing device is corrected, (i) diameter of detected or identified ROIs and (ii) projection angle of junction(s) or connection (s) are calculated followed by classifying the ROI as either a junction or a connection using heuristics based on material, size, and orientation of the first set of objects in frame(s).

12. The system of claim 11, wherein the change in the liquid level from the one or more generated contours is detected by:
   fitting two or more lines in each of the one or more generated contours;
   determining one or more intersection points of the two or more lines;
   calculating an angle of intersection and generating a circle with radius R using the one or more intersection points of the two or more lines, wherein the circle is a heuristic for diameter of the liquid pipeline and the angle of intersection approximates a segment covered by liquid;
   calculating a segment intersection using the angle of intersection and the generated circle, wherein an area of segment of intersection point with the generated circle is calculated and liquid level in percentage is derived; and
   detecting the change in the liquid level based on the segment intersection by tracking a percentage of liquid level across multiple frames and if exists a predefined percentage change in the liquid level in the frame with respect to a base frame, then that specific frame is identified and classified as liquid level change.

13. The system of claim 11, wherein the one or more defects comprise at least one of (a) one or more fractures, (b) one or more breaks, and (c) one or more cracks, and wherein the one or more defects are identified as at least one of (a) the one or more fractures, (b) the one or more breaks, and (c) the one or more cracks based on a defect ratio area, wherein the first set of objects are at least one of a structural object type including junction and connection, and cracks and fractures and a functional object type, and
   wherein the one or more hardware processors are further configured by the instructions to compute a severity of the one or more identified defects based on a location associated therewith.

14. The system of claim 11, wherein the one or more defects are identified using a semantic segmentation technique, wherein the one or more defects identified around a wall of the liquid pipeline are classified as one of (i) a longitudinal defect type or (ii) a circumferential defect type, wherein the one or more defects identified around one or more junctions of the liquid pipeline are classified as one or more junction types, wherein the one or more defects identified around the one or more junctions of the liquid pipeline are based on a change in structural position of the one or more junctions, wherein the one or more junction types includes incorrect position, intruding, damaged and blocked, and
   wherein one or more joints are identified in the liquid pipeline based on the extracted one or more optimal frames using a set of filters by:

segmenting wall of the liquid pipeline into one or more regions using a semantic segmentation technique to obtain a plurality of regions of interest;

applying a first pre-processing filter on the plurality of regions of interest to obtain a plurality of pre-processed regions of interest;

applying, (i) a second pre-processing filter and a thresholding technique on the plurality of pre-processed regions of interest to obtain at least a subset of regions of interests; and applying a transformation technique on the subset of regions of interests to identify the one or more joints.

15. The system of claim 11, wherein the one or more hardware processors are further configured by the instructions to:

detect, using a classification model, a second set of objects that are different from the first set of objects;

pre-process the second set of objects to obtain a set of pre-processed objects;

apply a set of domain-based rules on the pre-processed objects to obtain at least a subset of the set of pre-processed objects; and classify the subset of the set of pre-processed objects.

16. A computer program product comprising a non-transitory computer readable medium having a computer readable program embodied therein, wherein the computer readable program, when executed on a computing device causes the computing device to:

receive an input data comprising at least one of a video data, and one or more images from an image capture device, wherein the input data is specific to a liquid pipeline of a transmission pipeline type, a distribution pipeline type;

extract one or more optimum frames from the input data specific to the liquid pipeline upon estimating parameters including average luminescence level, a contrast level, and a blur index;

dehaze the one or more extracted optimum frames to obtain one or more dehazed images by extracting one or more local properties of opacity and air-light for each pixel in the extracted optimum frames, wherein the extraction of the local properties results in obtaining an opacity map that is smoothened to extract haze free images;

identify from the one or more dehazed images one or more identified liquid banks and generate one or more contours based on the one or more identified liquid banks;

detect a change in a liquid level from the one or more generated contours;

estimate a pose of the image capturing device based on (i) an angle of intersection, (ii) a segment intersection and (iii) a generated circle obtained from the one or more generated contours using a visual sensor in confined noisy environment and the segment intersection is calculated using angle of intersection and the generated circle obtained from one or more generated contours;

identify a first set of objects in the liquid pipeline using the estimated pose;

identify one or more defects in the liquid pipeline based on the first set of identified objects; and classify the one or more defects into one or more categories, wherein the step of classifying including identifying region of interests (ROIs) and correcting image pose considering rotation of the image capturing device, wherein once the pose of the image capturing device is corrected, (i) diameter of detected or identified ROIs and (ii) projection angle of junction(s) or connection (s) are calculated followed by classifying the ROI as either a junction or a connection using heuristics based on material, size, and orientation of the first set of objects in frame(s).

17. The computer program product comprising a non-transitory computer readable medium of claim 16, wherein the change in the liquid level from the one or more generated contours is detected by:

fitting two or more lines in each of the one or more generated contours;

determining one or more intersection points of the two or more lines;

calculating an angle of intersection and generating a circle with radius R using the one or more intersection points of the two or more lines, wherein the circle is a heuristic for diameter of the liquid pipeline and the angle of intersection approximates a segment covered by liquid;

calculating a segment intersection using the angle of intersection and the generated circle, wherein an area of segment of intersection point with the generated circle is calculated and liquid level in percentage is derived; and detecting the change in the liquid level based on the segment intersection by tracking a percentage of liquid level across multiple frames and if exists a predefined percentage change in the liquid level in the frame with respect to a base frame, then that specific frame is identified and classified as liquid level change.

18. The computer program product comprising a non-transitory computer readable medium of claim 16, wherein the one or more defects comprise at least one of (a) one or more fractures, (b) one or more breaks, and (c) one or more cracks, and wherein the one or more defects are identified as at least one of (a) the one or more fractures, (b) the one or more breaks, and (c) the one or more cracks based on a defect ratio area, wherein the first set of objects are at least one of a structural object type including junction and connection, and cracks and fractures and a functional object type, and wherein the computer readable program, when executed on the computing device further causes the computing device to compute a severity of the one or more identified defects based on a location associated therewith.

19. The computer program product comprising a non-transitory computer readable medium of claim 16, wherein the one or more defects are identified using a semantic segmentation technique, wherein the one or more defects identified around a wall of the liquid pipeline are classified as one of (i) a longitudinal defect type or (ii) a circumferential defect type, wherein the one or more defects identified around one or more junctions of the liquid pipeline are classified as one or more junction types, wherein the one or more defects identified around the one or more junctions of the liquid pipeline are based on a change in structural position of the one or more junctions, wherein the one or more junction types includes incorrect position, intruding, damaged and blocked, and wherein one or more joints are identified in the liquid pipeline based on the extracted one or more optimal frames using a set of filters by:

segmenting wall of the liquid pipeline into one or more regions using a semantic segmentation technique to obtain a plurality of regions of interest;

applying a first pre-processing filter on the plurality of regions of interest to obtain a plurality of pre-processed regions of interest;

applying, (i) a second pre-processing filter and a thresholding technique on the plurality of pre-processed regions of interest to obtain at least a subset of regions of interests; and applying a transformation technique on the subset of regions of interests to identify the one or more joints.

20. The computer program product comprising a non-transitory computer readable medium of claim 16, wherein the computer readable program, when executed on the computing device further causes the computing device to:

detect, using a classification model, a second set of objects that are different from the first set of objects;

pre-process the second set of objects to obtain a set of pre-processed objects;

apply a set of domain-based rules on the pre-processed objects to obtain at least a subset of the set of pre-processed objects; and classify the subset of the set of pre-processed objects.

\* \* \* \* \*